United States Patent [19]

Place et al.

[11] 4,220,431

[45] Sep. 2, 1980

[54] APPARATUS FOR IN FIELD UNITIZING OF CONTAINERS

[75] Inventors: Eugene W. Place; David M. Williams, both of Salinas, Calif.

[73] Assignee: Eagle Research and Development, Inc., Salinas, Calif.

[21] Appl. No.: 833,226

[22] Filed: Sep. 14, 1977

[51] Int. Cl.[2] .......................................... B65G 57/00
[52] U.S. Cl. ..................................... 414/35; 206/408; 296/181; 414/97
[58] Field of Search ................. 214/10.5 R, 6 R, 6 S; 53/156; 100/1, 7; 206/386, 408, 499, 821; 296/14, 181, 56-62; 414/35, 28, 97

[56] References Cited

U.S. PATENT DOCUMENTS

| | | | |
|---|---|---|---|
| 563,173 | 6/1896 | Herriman | 296/59 |
| 2,108,364 | 2/1938 | Buccicone | 271/171 |
| 2,602,554 | 7/1952 | Griffith | 214/6 S X |
| 2,720,323 | 10/1955 | Hoiles | 100/1 X |
| 2,844,091 | 7/1958 | Shafer et al. | 100/25 |
| 3,439,605 | 4/1969 | Hanley | 214/6 S X |
| 3,556,326 | 1/1971 | Cline | 414/35 X |
| 3,620,388 | 11/1971 | Mansson | 214/10.5 R |
| 3,743,112 | 7/1973 | Cooley | 214/6 S |
| 3,961,714 | 6/1976 | Buehler | 214/6 S X |

*Primary Examiner*—Frank E. Werner
*Attorney, Agent, or Firm*—Brown & Martin

[57] ABSTRACT

A carton stacking guide assembly for guiding the stacking of cartons in tiers, such as on pallets, includes elongated hinge bars extending parallel along opposite sides of a support platform, such as the load supporting platform of a cargo vehicle, with detachable first and second guide panels connected together at right angles to each other and hingedly connected to the guide bar for extending vertically from the support platform for guiding the stacking of cartons at the corners of a stack. The guide panels are open to reduce the wind resistance thereof and includes an elongated handle connected to the lower end of one of the panels a flexible tension member detachable connected at one end of the panel spaced upward from the hinge axis thereof and at the other end to the elongated handle spaced outward from the connection of the handle to the panel for assisting in tilting the guide assembly between a vertical guiding position and a horizontally extending nonguiding position.

14 Claims, 6 Drawing Figures

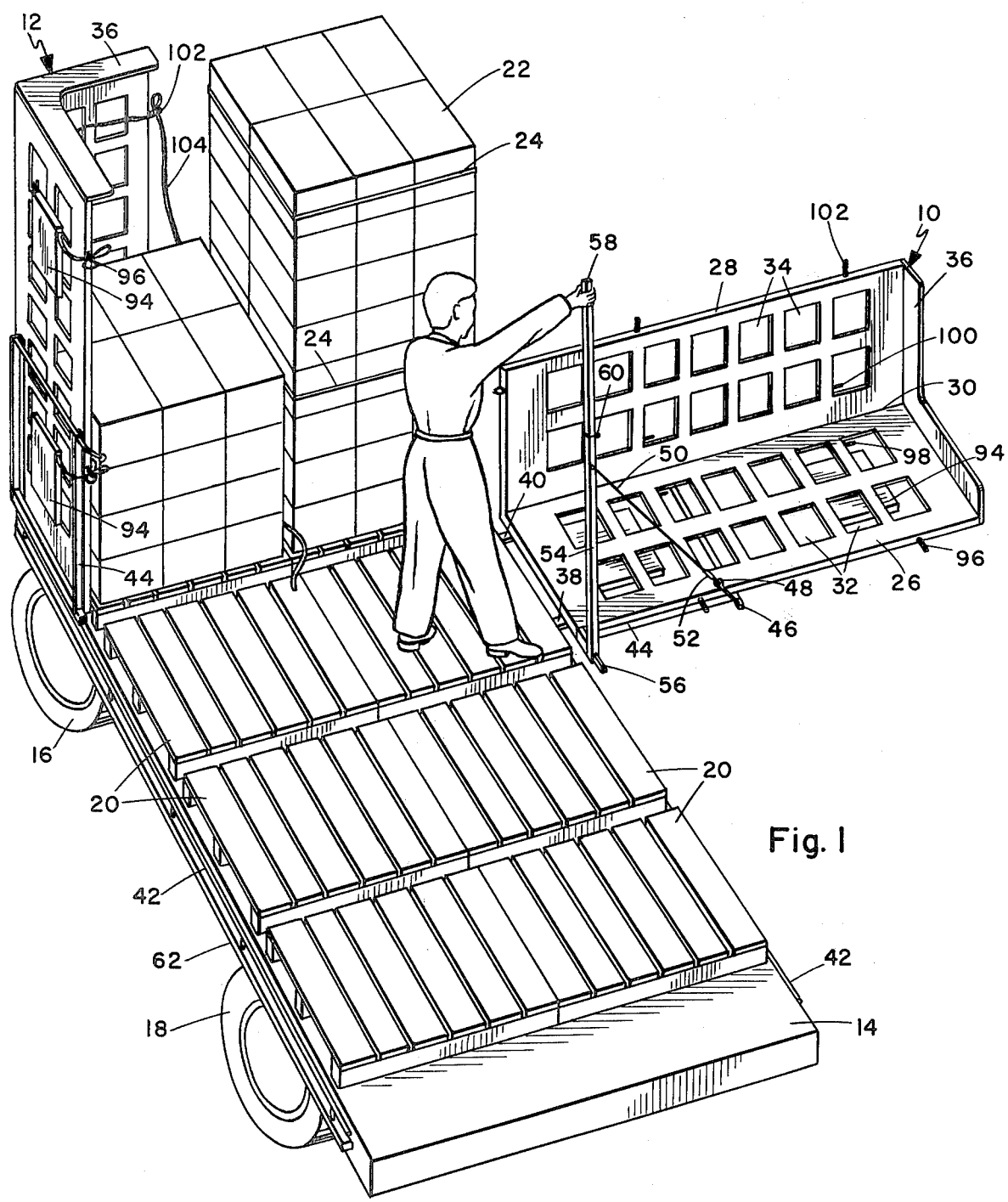
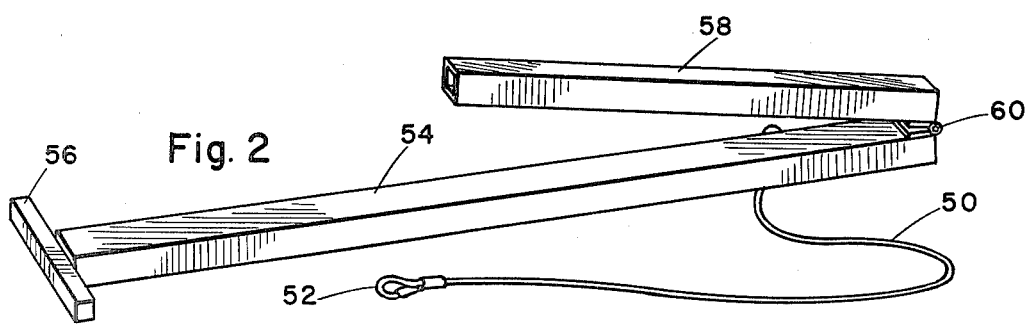

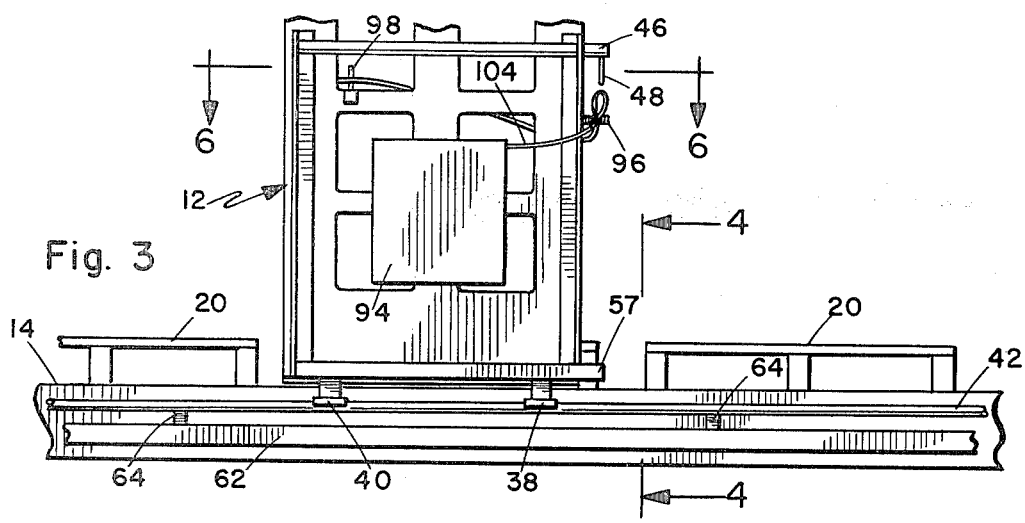
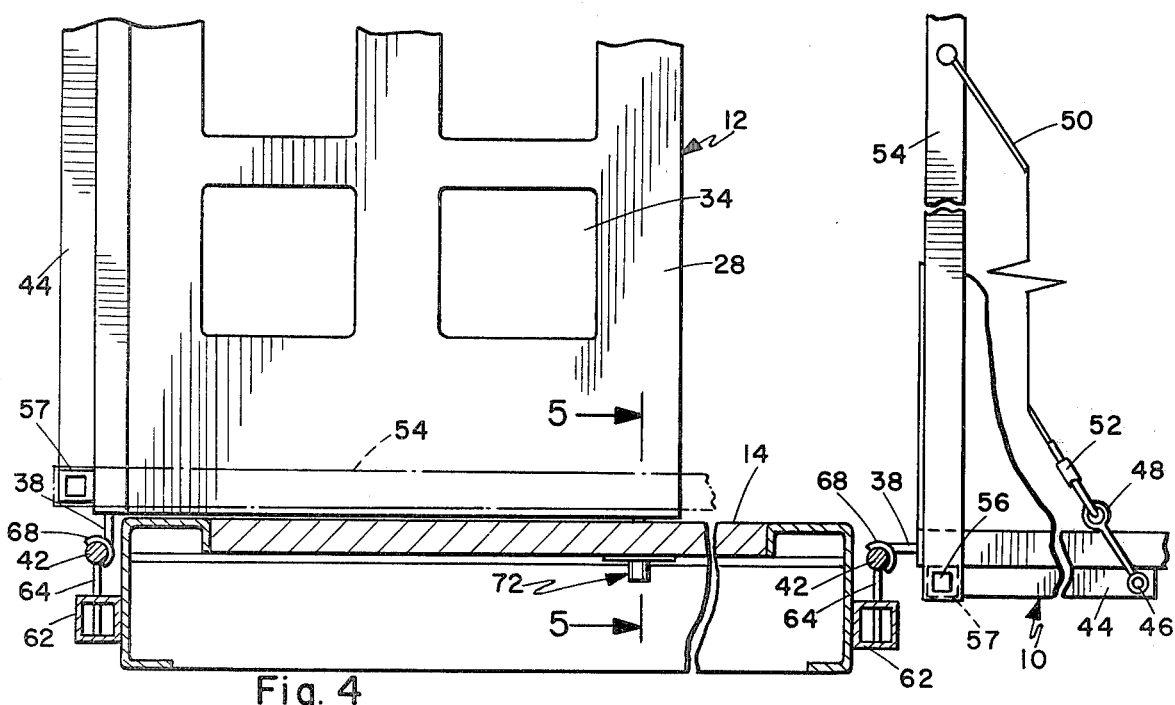
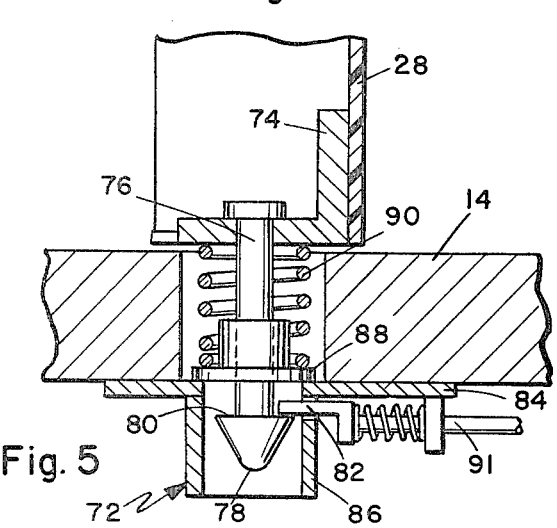
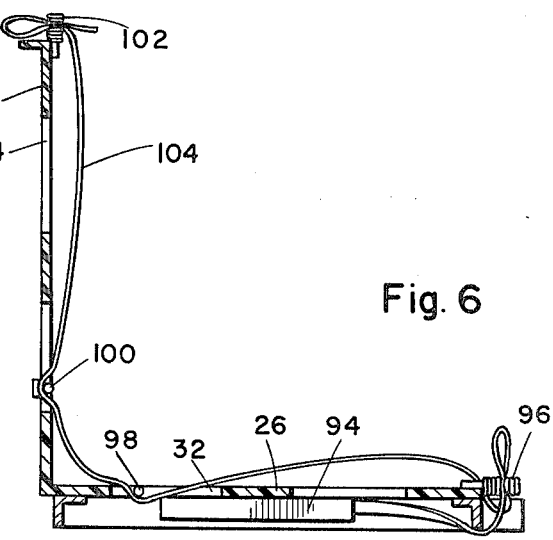

APPARATUS FOR IN FIELD UNITIZING OF CONTAINERS

BACKGROUND OF THE INVENTION

The present invention relates generally to cargo handling and pertains particularly to guide means for guiding the stacking of cartons on a pallet.

A great many products are packaged in cartons and shipped to distant locations for distribution and sale to the ultimate consumer. Many of such articles shipped include fresh produce harvested and packed in the fields in containers such as cartons. These cartons are then normally loaded onto field trucks and shipped to storage and warehousing areas and then re-shipped by truck or rail to the ultimate destination. The handling and shipment of such cargo can be greatly enhanced when the cartons can be handled by lift trucks on pallets.

The multiple manual handling of the cartons often result in substantial damage to the fiberboard cartons or containers and consequently result in damage to the articles or produce contained therein. It is desirable to reduce the manual handling of the paperboard cartons in order to reduce the damage to the contents thereof. It is also desirable to reduce the manual handling of such cartons in order to reduce the cost of labor involved in producing and shipping the goods.

One drawback to the extensive mechanical handling of such cartons is the lack of standard dimension of pallets through the industry. Frequently different sized pallets are used in the field, in the warehousing areas, and in grocery stores. Accordingly it is sometimes necessary to shift the cartons from one size pallet to another several times between the production point and ultimate destination.

However, attempts to standardize the pallet for continued use of the same pallet from field loading to the ultimate distributor requires the proper stacking and arrangement of the cartons on the pallets. It has been found that properly stacked and secured cartons on a pallet can be mechanically moved through the various stages of transportation from the field to the ultimate consumer. This proper stacking of the load, however, is required in order to reduce the damage to the cartons and to provide the required close fitting of the palletized stacks in warehouses and transport vehicles.

Mis-aligned cartons prevent the close stacking of cartons necessary for efficient and effective loading of transport vehicles by mechanical means. The lack or mis-alignment of the cartons also effect the support thereof. It has been shown, for example, that as little as a half inch of mis-alignment of cartons in a column or stack can reduce the stacking strength of the column or carton by as much as 25 to 30 percent. Such mis-alignment is quite common in stacking as presently practiced in the field.

Accordingly it is desirable that some means be available to effectively stack cartons on a pallet in a precisely aligned arrangement to enhance the strength thereof and to further enhance the loading and handling thereof on cargo vehicles.

SUMMARY AND OBJECTS OF THE INVENTION

Accordingly it is the primary object of the present invention to overcome the above problems of the prior art.

Another object of the present invention is to provide apparatus for proper guidance of stacking of cartons on a pallet.

A further object of the present invention is to provide a method and apparatus for easily and quickly guiding the stacking of cartons on a pallet.

A further object of the invention is to provide apparatus that is light in weight, readily portable and easily attached and detached from transport vehicles that is effective to guide the stacking of cartons on a pallet.

A further object of the present invention is to provide stacking guide means for field vehicles that requires the minimum of alteration in the vehicle.

In accordance with the primary aspect of the present invention, a cargo stacking guide assembly for aligning tiers of cartons on a pallet or the like includes a support member having a hinge bar mounted thereon with guide means slideably and pivotally mounted on the hinge bar and pivotal between guiding and non-guiding positions for guiding the stacking of a plurality of tiers of cartons at least at one corner of a stack of cartons.

BRIEF DESCRIPTION OF THE DRAWINGS

The above and other objects and advantages of the present invention will become apparent from the following description when read in conjunction with the drawings, wherein:

FIG. 1 is a perspective view showing the operation of the apparatus.

FIG. 2 illustrates the guide operating handle.

FIG. 3 is a side elevation view of one guide and its mounting.

FIG. 4 is an enlarged sectional view taken on line 4—4 of FIG. 3.

FIG. 5 is an enlarged sectional view taken on line 5—5 of FIG. 4.

FIG. 6 is an enlarged sectional view taken on line 6—6 of FIG. 3.

DETAILED DESCRIPTION OF A PREFERRED EMBODIMENT

Turning now to FIG. 1 of the drawing, there is illustrated first and second guide assemblies designated generally by the numerals 10 and 12 respectively, shown in operative combination with a cargo supporting platform 14 such as the cargo supporting bed of a transport vehicle having pairs of ground engaging wheels 16 and 18. The load guide assemblies 10 and 12 are mirror images of each other and, as illustrated, are disposed on opposite parallel sides of the load supporting platform on the vehicle. Supported on the vehicle load platform 14 are a plurality of loading pallets 20 of a desired size. These pallets may be of the wooden type, as shown, or may be slip sheets of a well known construction. Any type and size of pallets may be used.

Shown on the rearward end of the cargo vehicle is a stack 22 of cartons which have been stacked in an aligned configuration by the use of the guide assembly 10. This stack of cartons is further reinforced in its position by means of tapes 24, as will be described.

The guide assembly 10 comprises a pair of flat generally rectangular open panels 26 and 28 joined together at their edges at a 90° angle, forming a corner 30 therebetween. These panels are open panels having a plurality of openings 32 and 34 respectively for reducing the weight thereof and for also reducing the sail area thereof or, more particularly, the response or resistance to wind. The panels may be constructed of any substantially rigid light weight structure, such as fiberglass, sheet metal, and sheets of plywood and the like. The panels may be preferably reinforced at the top by a modified gusset 36 secured to the upper end of both panels. This reinforces the panels and maintains the right angle configuration thereof.

The panel 26 extends in a plane parallel to the edge of the load platform and is pivotally connected by means of a pair of hinges 38 and 40 to elongated hinge bars 42 secured to opposite parallel sides of the vehicle platform. The hinge arrangement, as will be described, is such that the panels or loading guide assembly 10 may be removed from the vehicle platform 14 for use on another vehicle. In a preferred arrangement, the pallet guide is mounted on a support frame 44 to which the hinges 38 and 40 are connected. This pallet guide support frame extends upward substantially a third of the height of the panel 26 and includes a connecting bracket or the like 46 to which is connected an eye bolt 48. A flexible tension member such as a cable 50 extends diagonally from a lever 54 and is detachably secured to eye bolt 48 by a snap hook 52, or the like. The lever 54 has a double ended plug 56 at one end, which can be inserted into the lower member 57 of support frame 44. The opposite end of the lever 54 includes an extension 58 which is hingedly connected at 60 to the outer end of the portion 54. This permits the lever to be extended outward for greater leverage or to be folded up out of the way. The detachable connection 52 permits the tension member to be secured when it is necessary to tilt the guide assembly 10 outward, as shown in FIG. 1, or to disconnect it for preventing interference thereof with the loading operation when the guide assembly is in the vertical position as shown with respect to guide 12. This guide support frame 44 permits the panels 26 and 28 to be a lighter and less rigid construction.

Turning now to FIG. 4 of the drawing, details of the hinge arrangement are illustrated. The hinge bar 42 is of a generally cylindrical outer configuration and may be either a solid cylinder or a tubular configuration as shown. This hinge bar is supported on a mounting bar 62 by means of narrow posts 64 extending upward from the bar 62 and supporting the hinge bar 42 at the center thereof. The post 64 is of a narrow construction to provide maximum outer diameter of the bar 42 for the hinge action. The mounting bar 62 is secured in a suitable manner to the vehicle platform or bed 14.

The hinge 38 includes a generally C-shaped hinge or bearing portion 68 which partially encircles and is journalled to the outer diameter of the bar 42. This C-shaped bearing portion may be sufficient to extend greater than one half the diameter of the bar 42 and thus encompass the bar such that it must be slid off the end of the bar. With a length, however, equal to or less than the one half the circumference of the bar 42 the hinge may be simply lifted on and off the bar 42. The placement of the bearing portion 68 is such that at least a major portion of the bearing surface will be on the upper surface of the bar 42 for supporting the panels 26 and 28 of the guide assembly. The hinge 38 is secured to the guide frame 44 by any suitable means. Other constructions of the hinge may be possible, however the illustrated embodiment provides ease of mounting and dismounting of the guide structure on the vehicle.

Turning now to FIG. 5 of the drawings, the details of a suitable latch mechanism 72 is illustrated. This latch mechanism comprises a bracket 74 on the lower edge of panel 28, having an elongated stud 76 having a substantially conical shaped head 78 defining a latch shoulder 80. A latch member 82 mounted on the support bracket or latch bracket 84 is biased into a slot in a socket member 86 in platform 14 for engagement with shoulder 80 for retaining the latch in a latched position. A collar 88 on stud 76 is biased by a coiled spring 90 to bear on bracket 84 when the latch is secured, and provides a separating action when latch member 82 is withdrawn. An actuating rod 91 extends from latch member 82 to any convenient location for operation of the latch.

An additional feature of the invention is the adaption and use of strapping tape in conjunction with the use of the apparatus. As best shown, for example, in FIG. 6, a strapping tape roll 94 is mounted on the outside of the panel of guide assembly 12 and is thus used by pulling a slip of the tape and extending it through spring type or like guide members 96 at the edges of the panels, extending the tape around to and over pegs 98 and 100 on the panels and thence to guide 102 on the opposite or adjacent panel and then extending between adjacent stacks. The tape 104 may then be secured around the cartons in a tier in the stack of cartons. Additional rolls and additional guide and support pins may be mounted on the guide assemblies at selected vertical positions along the height thereof.

In operation of the present invention, a cargo vehicle support bed or platform is provided with guide or hinge bars 42 for accomodating one or more of the guide structures. A guide structure is selected and placed on the guide bar with the hinge bearing portion 68 engaging the outer surfaces of the guide bar 42. The guide assembly is best placed in position on the bar while in its horizontal position as shown with respect to guide 10 in FIG. 1. The assembly may then be tilted upward to its vertical position by use of the lever 54 and extension 58, connected by the the tension member 50 to the guide frame 44. Once in its vertical position the latch mechanism 72 is latched into position for assisting and holding the arrangement vertically and in maintaining the square guide configuration of the adjacent panels. In the vertical position the tension member 50 is then released by disconnecting latch 52 to permit it to fall out of the way of stacking cartons. Extension 58 is folded and the lever 54 will fit down between the pallets 20 clear of the work area, as indicated in broken line in FIG. 4. The cartons are then stacked in the guide structure with the corner cartons forced into tight engagement with the corner arrangement defined by the two panels and a stack built up as shown in FIG. 1. As each carton is put into place it is forced tightly against the sides of the adjacent cartons. This insures that a uniform and straight stack, as shown in FIG. 1, is provided. The cartons in the tiers are built up to form a stack as shown. A strapping tape may then be placed around one or more tiers of the stack to assist in maintaining the integrity of the stack. Additional features may be such as, placement of glue between the cartons in between the upper and lower surfaces between the tiers of cartons. Thus an upper carton is essentially glued lightly to a lower carton on which it rests. This prevents shifting of the cartons once put into place. Additionally, pallets may be placed between various tiers in a stack. Such pallets may be of the wooden type as illustrated or slip sheets may be utilized.

The guide is transferred from truck to truck in the field. As a truck is loaded, the guide structure is removed from that truck and placed on the next truck for loading.

The guide structure is slid along from position to position along the length of the bed. As soon as a stack is completed the guide structure is pivoted away to the side and slid along the hinge bar to the next position, pivoted up to its guide position and the next stack formed. The stacking is preferably from the back to the front of the bed of the truck so that the driver can see what is taking place.

While the present invention has been illustrated and described by means of a particular embodiment, it is to be understood that numerous changes and modifications may be made therein without departing from the spirit and scope of the invention as defined in the appended claims.

Having described our invention, we now claim:

1. A carton stacking guide assembly for guiding the stacking of cartons in tiers, wherein the improvement in said guide assembly comprises:
    a flat planar support member;
    an elongated hinge bar mounted on and extending horizontally and parallel to an edge of said support member;
    first and second vertically extending guide members connected together at a right angle to one another, one of said first and second members having means at a bottom edge thereof for pivotally and slideably mounting on said hinge bar for swinging the same about a horizontal axis into and out of vertical alignment relative to said support member and for movement to multiple positions along said support member for engaging and guiding a plurality of adjacent stacked tiers of cartons into alignment on said support member.

2. The guide assembly of claim 1, wherein said guide members comprise a pair of substantially rigid panels for aligning at least a plurality of tiers of cartons at one corner of a stack.

3. The guide assembly of claim 1, said support member is the cargo bed of a mobile vehicle.

4. The guide assembly of claim 1, wherein said guide members are detachably mounted on said hinge bar for quick detachment from said bar.

5. A carton stacking guide assembly for guiding the stacking of cartons in tiers, wherein the improvement comprises:
    a support member;
    an elongated cylindrical hinge bar mounted on said support member by support brackets connected thereto by narrow support bars leaving at least 270° of the outer surface of said bar free of obstruction along the length thereof; and
    first and second vertically extending guide members connected together at a right angle to one another, one of said first and second members having means at a bottom edge thereof for pivotally and detachably mounting on said hinge bar for swinging together into and out of vertical alignment relative to said support member and for sliding movement to multiple positions along said hinge bar for engaging and guiding a plurality of adjacent stacked tiers of cartons.

6. The guide assembly of claim 5, including a plurality of hinge members secured to said guide members and including a C-shaped hinge body slideably and rotatably embracing said hinge bar.

7. The guide assembly of claim 6, wherein said support member is the load supporting platform of a mobile cargo vehicle.

8. The guide assembly of claim 7, wherein said platform includes a pair of said hinge bars extending along opposite parallel edges of said platform.

9. The guide assembly of claim 8, wherein one of said panels extends in a plane parallel to said hinge bar, and the other of said panels extends in a plane at a right angle to the axis of said hinge bar.

10. A carton stacking guide assembly for guiding the stacking of cartons in tiers, comprising:
    a load supporting platform of a mobile cargo vehicle;
    a pair of elongated cylindrical members having hinge bars mounted on opposite parallel edges of said supporting platform by support brackets connected thereto by narrow support bars leaving at least 270° of the outer surface of said bar free of obstruction along the length thereof; and
    first and second vertically extending guide panels connected together at right angles to one another and pivotally and detachably mounted on said hinge bar for swinging together into and out of vertical alignment relative to said support member for engaging and guiding a plurality of adjacent tiers of cartons at a corner of a stack, one of said panels extending parallel to said hinge bar and including a plurality of hinge members secured to said guide members and including a C-shaped hinge body for slideably and rotatably embracing said hinge bar, said one of said panels is connected at its lowermost edge to said hinge members and the other of said panels includes latching means secured to its lowermost edge for cooperatively engaging cooperative latch means on said platform for retaining said panel members in a vertically oriented position.

11. The guide assembly of claim 10, including handle means extending outward from said one panel for assisting in pivoting said panels between a vertically oriented guiding position and a horizontally extending shifting position.

12. The guide assembly of claim 11, wherein said handle means comprises an elongated bar detachably secured at one end to said one panel at the lowermost edge thereof, and
    an elongated detachable tension member connected at one end to said elongated bar spaced from said one end and connected at the other end to said one panel at a point spaced upward from the lowermost edge thereof.

13. The guide assembly of claim 12, including tilt frame means for supporting said panels to said hinge bar.

14. The guide assembly of claim 12, wherein said panels are open panels having a plurality of openings therethrough for permitting the free flow of air therethrough.

* * * * *